(12) United States Patent
Pohl et al.

(10) Patent No.: US 7,681,937 B2
(45) Date of Patent: Mar. 23, 2010

(54) CLOSURE DEVICE FOR A CABRIOLET ROOF STRUCTURE

(75) Inventors: Peter Pohl, Pentenried (DE); Jürgen Stenvers, Munich (DE); Adam Wagner, Germering (DE); Thorsten Schmeier, Germerswang (DE)

(73) Assignee: Webasto AG, Stockdorf (DE)

( * ) Notice: Subject to any disclaimer, the term of this patent is extended or adjusted under 35 U.S.C. 154(b) by 0 days.

(21) Appl. No.: 12/096,134

(22) PCT Filed: Dec. 5, 2006

(86) PCT No.: PCT/DE2006/002159

§ 371 (c)(1),
(2), (4) Date: Jun. 4, 2008

(87) PCT Pub. No.: WO2007/065418

PCT Pub. Date: Jun. 14, 2007

(65) Prior Publication Data

US 2008/0265630 A1     Oct. 30, 2008

(30) Foreign Application Priority Data

Dec. 5, 2005    (DE) ................. 10 2005 058 008

(51) Int. Cl.
*B60J 7/08*     (2006.01)

(52) U.S. Cl. ....................................................... 296/115
(58) Field of Classification Search ............ 296/107.01, 296/115, 117
See application file for complete search history.

(56) References Cited

FOREIGN PATENT DOCUMENTS

| DE | 43 03284 | 6/1994 |
|----|----------|--------|
| EP | 0940282 | 9/1999 |
| EP | 1 256475 | 11/2002 |

OTHER PUBLICATIONS

International Search Report dated Mar. 22, 2007.

*Primary Examiner*—Lori L Lyjak
(74) *Attorney, Agent, or Firm*—Fitch, Even, Tabin & Flannery; John M. Naber

(57) ABSTRACT

A closure device is provided for a cabriolet roof structure having at least one closure element which can assume an open position and a closed position, wherein the closure device is at least at times assigned a sensor device which can detect the open position and the closed position. According to the invention, it is provided that the sensor device comprises only one sensor which generates a first signal when the open position is reached and which generates a second signal when the closed position is reached. The invention also relates to a roof structure for a cabriolet and to a method for monitoring a closure device for a cabriolet roof structure.

17 Claims, 4 Drawing Sheets

CLOSURE DEVICE FOR A CABRIOLET ROOF STRUCTURE

This application is a 35 U.S.C. §371 National Stage entry of PCT/DE2006/002159, filed Dec. 5, 2006, which claims priority from German Patent Application No.: DE 10 2005 058 008.4, filed Dec. 5, 2005, the contents of which are herein incorporated by reference.

The invention relates to a closure device for a cabriolet roof structure, with at least one closure element which can take up an open position and a closed position, wherein the closure device is at least temporarily assigned a sensor device which can detect the open position and the closed position. Furthermore, the invention relates to a roof structure for a cabriolet. The invention also relates to a method for monitoring a closure device for a cabriolet roof structure, in particular a closure device according to the invention, wherein the closure device has at least one closure element which can take up an open position and a closed position, and wherein the closure device is at least temporarily assigned a sensor device which can detect the open position and the closed position.

It is required in particular to interrogate the open position and the closed position by means of a sensor device in order to obtain unambiguous information for the controlling means which controls the movement of the roof structure during the opening and closing of the folding top of the cabriolet. Only when the closure elements are unambiguously in their open position can the next, for example, hydraulic movement operation be begun. This prevents damage to the roof structure.

In order to detect the open position and the closed position of the closure element, it is customary in the prior art to use a separate sensor or a separate switching element in each case.

The invention is based on the object of developing the closure devices of the type in question and the methods of the type in question in such a manner that the open position and the closed position of the closure element can be detected more cost-effectively than in the prior art. This object is achieved by the features of the independent claims.

Advantageous embodiments and developments of the invention emerge from the dependent claims.

The closure device according to the invention builds on the prior art of the type in question in that the sensor device comprises just one sensor which generates a first signal when the open position is reached, and which generates a second signal when the closed position is reached. Since, in this solution, the open position and the closed position are detected by one and the same sensor, the number of sensors required in the prior art is halved. This can considerably reduce the costs of the parts.

In the case of the closure device according to the invention, it is preferably provided that the first signal is deactivated when the open position is departed from, and that the second signal is deactivated when the closed position is departed from. If the first signal and/or the second signal are/is a binary signal, both a positive and a negative logic can be applied. For example, it may be advantageous to actually generate a voltage only when the closure element is in positions which it takes up only for short periods of time. However, for safety reasons, it would probably be preferred in most cases to indicate the open position and the closed position by means of an active signal.

In particularly preferred embodiments of the closure device according to the invention, it is provided that the first signal and the second signal are identical. In the simplest and particularly preferred case, both the first signal and the second signal are formed by a simple HIGH level while the sensor always generates a LOW level when the closure element is neither in the open nor in the closed position. If the first signal and the second signal are identical, the state present when the first or second signal next occurs has to be known. For this purpose, for example, the position in which the closure element was in during the last occurrence of the first or second signal (open position or closed position) can be stored in a memory which is correspondingly updated during the next occurrence of the first or second signal.

For the closure device according to the invention, it is particularly preferred for the sensor device to have a first region which can be detected by the sensor and a second region which can be detected by the sensor, the first region being assigned to the open position and the second region being assigned to the closed position. In principle, sensors which operate contactlessly and also sensors which operate with mechanical contact are suitable as the sensor. For example, mini-switch sensors, optical sensors, capacitive sensors, inductive sensors, or corresponding mixed forms are possible, with the first region and the second region being suitably adapted in each case to the type of sensor used. For example, the first and/or the second region can have mechanical contact surfaces, which reflect optically to a greater or lesser extent or can give rise to capacitive and/or inductive changes.

In this context, it is considered particularly advantageous for the first region and the second region to be provided on the closure element. In this case, the sensor is preferably arranged at least temporarily in such a manner that it is activated by the first region in the open position of the closure element and is activated by the second region in the closed position of the closure element.

In a certain embodiment of the closure device according to the invention, it can be provided that the closure element and the sensor are arranged on the same component. This solution may be advantageous, for example, when the corresponding component is immovable and a particularly compact construction is desired, in which the wiring of the sensor is also to take place in an extremely simple manner.

However, embodiments of the closure device according to the invention are considered particularly advantageous in which it is provided that the closure element and the sensor are arranged on different components.

If at least one of the components is a movable component, the position of the movable component can additionally be detected by means of this solution. For example, a single sensor can therefore be used to detect the following three states: the closure element is in the open position, the closure element is in the closed position and the movable component has been moved, for example has been raised.

In a particularly preferred embodiment of the closure device according to the invention, it is provided that the sensor is a Hall sensor, and that the first region and the second region have different magnetic properties from the regions surrounding them. In this case, the first and the second regions can be formed in a particularly cost-effective manner by means of simple permanent magnets which, for example, are connected to the closure element in a suitable manner or are integrated therein.

Furthermore, it is preferred that the closure element comprises a hook. However, it is clear that, in principle, any desired closure elements are suitable, for example linearly movable closure bolts or any other locking elements well known to a person skilled in the art.

However, if the closure element comprises a hook, it is preferred that the hook forms a latch catch which interacts with a latch. In this case, the latch can be formed, for example, by means of a latch bar or latch bolt, with it being particularly preferred for the latch to be arranged on a movable component.

Every cabriolet roof structure which has at least one closure device according to the invention falls within the scope of protection of the associated claims.

In conjunction with a roof structure of this type, it is preferred that it has at least one closure device on its left side and on its right side. With a redundant embodiment of this type, the functional reliability is increased still further and a movement which has been begun can be reliably finished even if a sensor is defective.

It can furthermore be provided, in conjunction with the roof structure, without being limited thereto, that at least one closure element is arranged on a folding top compartment cover and at least one sensor is arranged on a locking arm. In a solution of this type, it is possible, for example, to detect a movement of the locking arm in addition to the open position and the closed position of the closure element.

The method according to the invention builds on the prior art of the type in question in that it comprises the following steps:
  generating a first signal by means of a sensor assigned to the sensor device when the open position is reached, and
  generating a second signal by means of the sensor when the closed position is reached.

The properties and advantages explained in conjunction with the closure device according to the invention are produced in an identical or similar manner by means of said solution, and therefore reference is made to the corresponding embodiments with a closure device according to the invention so as to avoid repetitions.

The same accordingly applies to the following preferred embodiments of the method according to the invention, with reference also being made in this regard to the corresponding embodiments in conjunction with the closure device according to the invention so as to avoid repetitions.

The method according to the invention furthermore preferably has the following steps:
  deactivating the first signal when the open position is departed from, and
  deactivating the second signal when the closed position is departed from.

In this case, it is preferred that the first signal and the second signal are identical.

A preferred development of the method according to the invention provides that it can furthermore comprises the following steps:
  carrying out a normalizing operation in order to establish which of the identical signals is the first signal and which is the second signal, and
  storing the results of the normalizing operation.

Such a normalizing operation can be carried out, for example, before the device is put into operation for the first time or if the information as to whether the first or second signal is currently assigned to the open position or to the closed position has been "lost". The normalizing operation can make provision, for example, for all of the closure devices to be brought into their open position when the vehicle is at a standstill. In this case, it is clear that, when the first or the second signal next occurs, the closed position has been reached.

Advantageous embodiments of the invention are explained by way of example below with reference to the associated drawings, in which.

In the figures, the same reference numbers refer to identical or similar components, at least some of which are only explained once so as to avoid repetitions.

Figure 1:
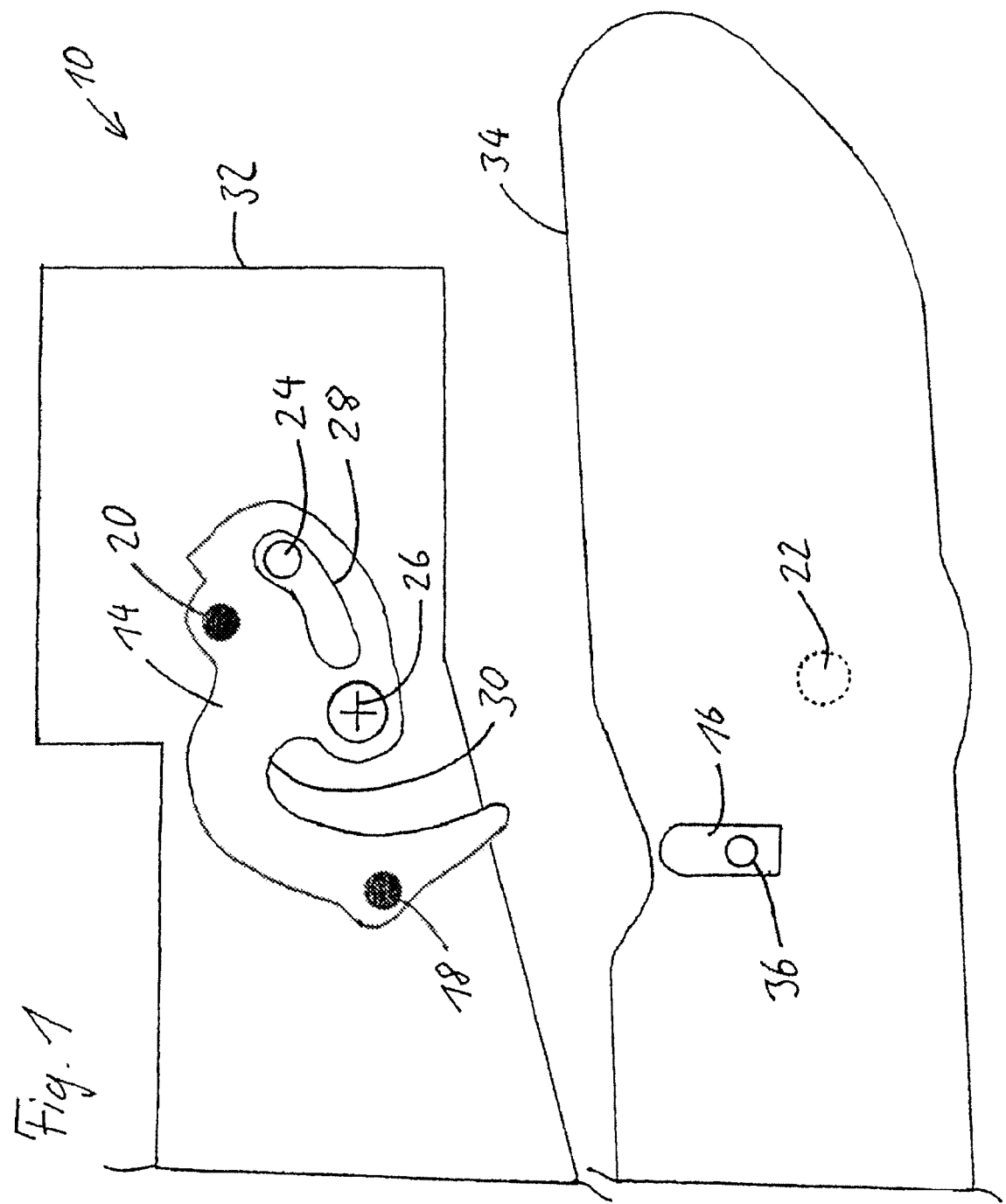
FIG. 1 shows a schematic illustration of an embodiment of the closure device according to the invention, with the two components which are to be closed not yet being in their closure position.

FIG. 1 illustrates a section of a first component 32 and a section of a second component 34 which is movable relative thereto. The first component 32 is, for example, a folding top compartment cover while the second component 34 can be formed by a locking arm of a cabriolet roof structure. The second component 34 has a bar-or bolt-shaped latch 22 which, with reference to the illustration, extends into the planes of the paper and is therefore illustrated in dotted form. Furthermore, the second component 34 is assigned a sensor 16 in the form of a half sensor which has a measuring region 36. The sensor 16 generates a signal when a magnet is arranged adjacent to its measuring region 36. The first component 32 is equipped with a closure element 14 which has a locking contour 30 which leads overall to the shape of a hook which forms a latch catch in conjunction with the latch 22. The closure element 14 is mounted pivotably about an axis of rotation 26, with a pivoting of the closure element 14 being caused by a driving pin 24 being moved by a driving device (not illustrated) horizontally to the left, with reference to the illustration of FIG. 1. In the case of such a movement to the left, the driving pin 24 slides in a driving track 28 provided in the closure element 14 (compare FIGS. 1 and 3). The closure element 14 has a first region 18 which can be detected by the sensor 16 and a second region 20 which can be detected by the sensor 16. In this case, the first region 18 is assigned to the open position of the closure element 14 and the second region 20 is assigned to the closed position of the closure element 14. Both the first region 18 and the second region 20 are formed by a respective permanent magnet.

Figure 2:
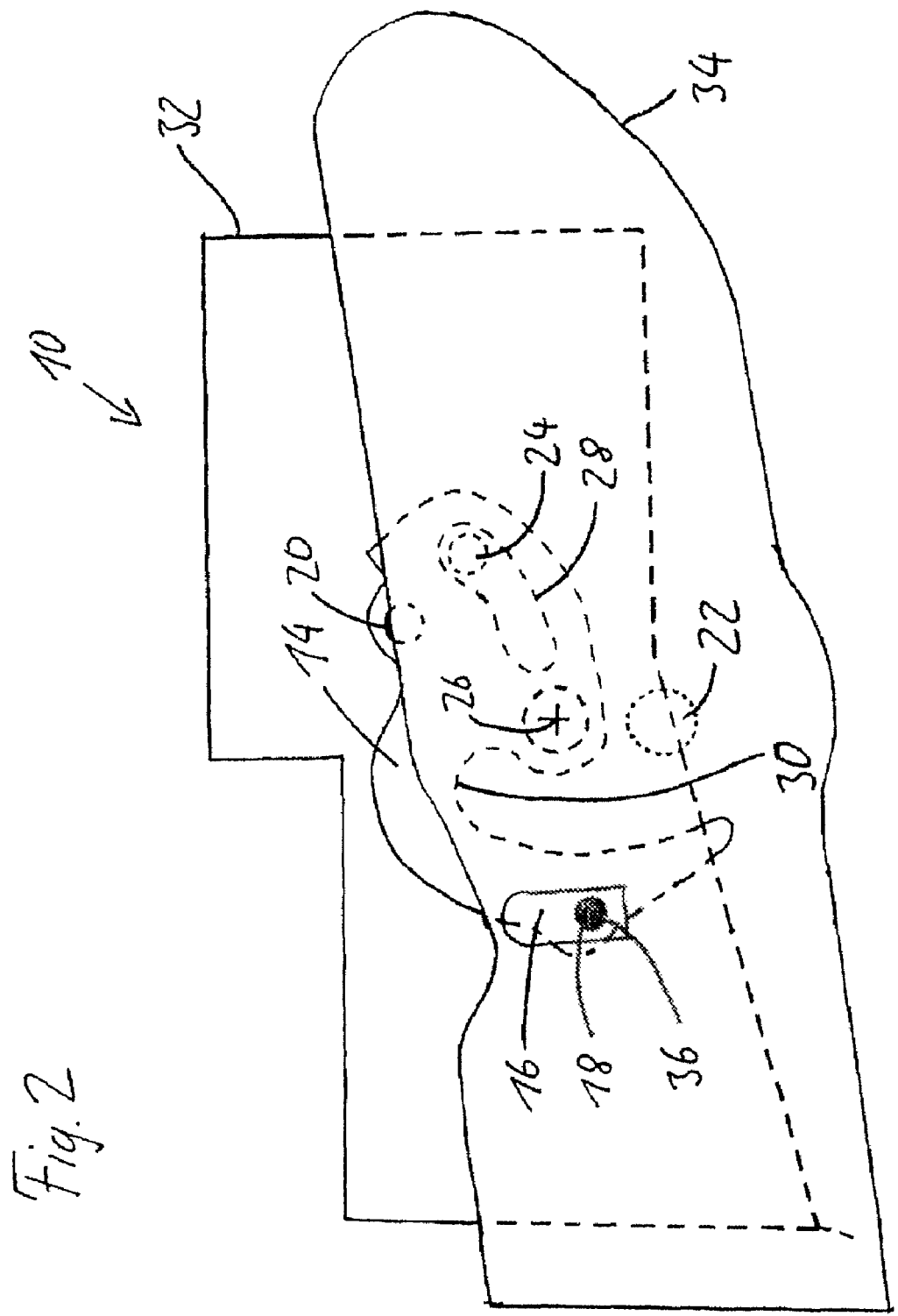
FIG. 2 shows the closure device from FIG. 1, with the two components to be closed being in their closure position, but the closure element still taking up its open position.

FIG. 2 shows the closure device from FIG. 1, with the two components 32, 34 to be closed being in their closure position. According to the illustration of FIG. 2, the closure element 14 is also still in the position shown in FIG. 1, namely in its open position, i.e. the first component 32 and the second component 34 are not yet closed. When the components 32, 34 are in the closure position illustrated in FIG. 2 and the closure element 14 has taken up its open position, the first region 18, which is formed by a permanent magnet, comes to lie directly adjacent to the measuring region 36 of the sensor 16, as indicated by the measuring region 36 which is illustrated in black in FIG. 2. Since the sensor 16 is a Hall sensor, the sensor 16 thereby generates a "first" signal. The electronic controlling means (not illustrated) knows that the sensor 16 has finally generated a signal as the closure element 14 has taken up its open position so as to permit the second component 34 to move away. Since the controlling means has not changed the position of the closure element 14 in the mean time, when the (first) signal occurs again, it concludes that the second component 34 has again moved toward the first component 32 and is now in its closure position. The controlling means can therefore indicate to the driving unit (not illustrated) to move the driving pin 24 to the left in order to close or to lock the components 32, 34.

Figure 3:
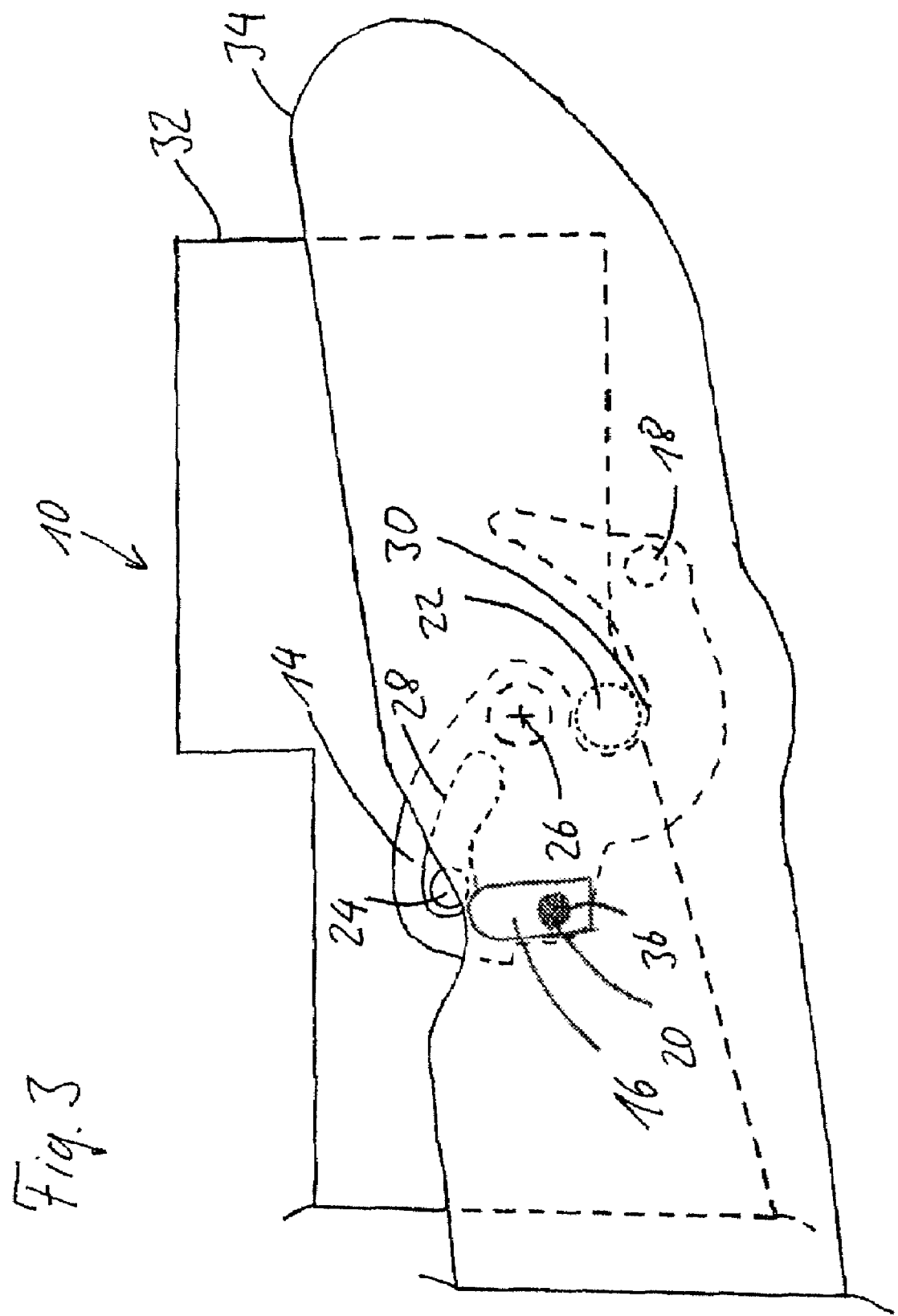
FIG. 3 shows the closure device from FIG. 1, with the two components to be closed being in their closure position and the closure element having taken up its closed position.

FIG. 3 shows the closure device of FIG. 1, with the two components 32, 34 being in their closure position and the closure element 14 having taken up its closed position. By means of the linear movement of the driving pin 24, the closure element 14 has rotated anticlockwise by circa 135° about the axis of rotation 26. As a result, the latch 22 has locked in the locking contour 30 of the closure element 14. In the closed position of the closure element 14 that is illustrated in FIG. 3, the second region 20, which is likewise formed by a permanent magnet, comes to lie directly adjacent to the measuring region 36 of the sensor 16. Since the sensor 16 has not generated a signal during the rotation of the closure element 14, because there was no magnet adjacent to its measuring region 36, the sensor 16 now generates a signal again, to be precise the second signal which, in the embodiment illustrated, is identical to the first signal. When the signal generated by the sensor 16 occurs again, the controlling means concludes that the closure element 14 is now in its closed position and the first component 32 is consequently securely closed by or locked to the second component 34.

A person skilled in the art will recognize that the method according to the invention for monitoring a closure device has been carried out during the above-explained locking of the components 32, 34, and therefore reference is also made to the above embodiments for the explanation of said method.

Furthermore, it is clear that an opening of the closure device or an unlocking operation is carried out in the reverse sequence to the sequence explained above.

Figure 4:
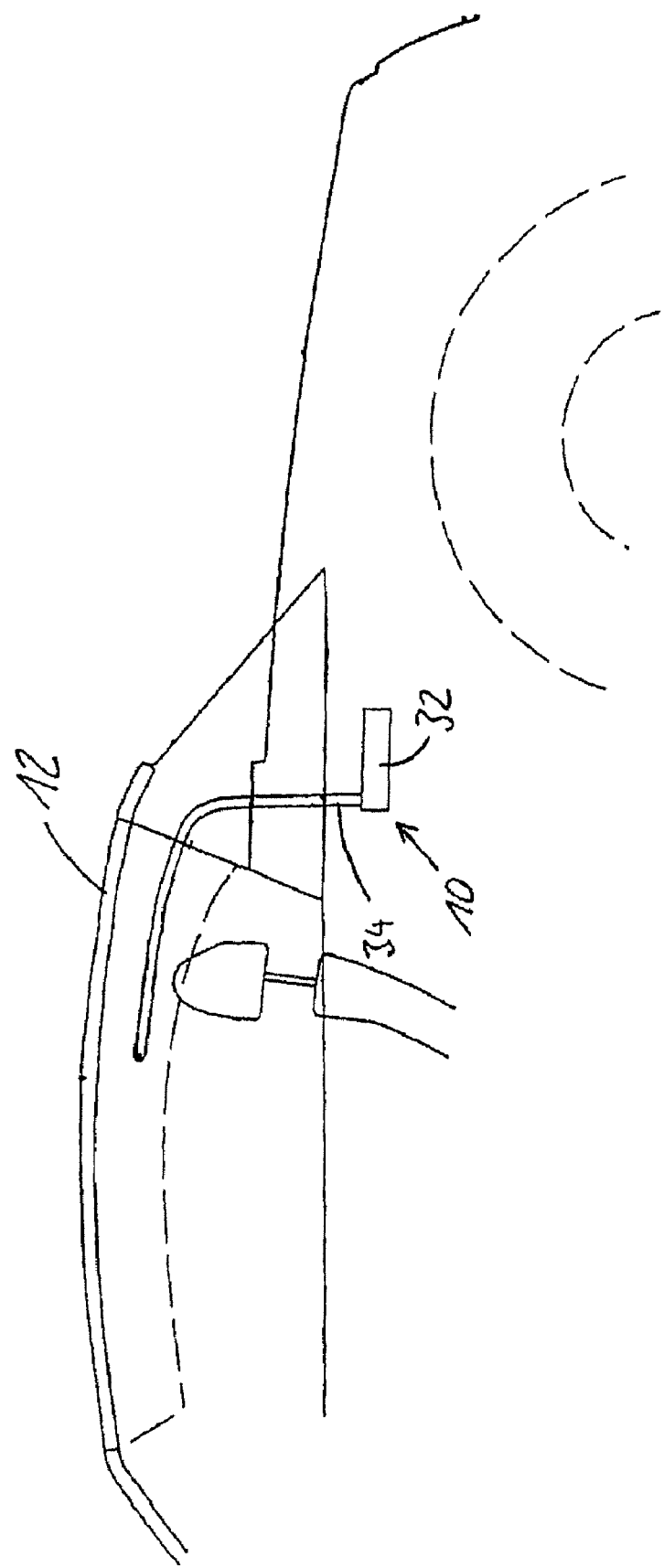
FIG. 4 shows a schematic illustration of a roof structure equipped with the closure device according to the invention.

FIG. 4 shows schematically a roof structure 12 for a cabriolet. In this case, a closure device 10 according to the invention is provided on each side of the vehicle, with only one such closure device 10 being indicated.

The features of the invention which are disclosed in the above description, in the drawings and in the claims may be essential both individually and in any desired combination in order to realize the invention.

The invention claimed is:

1. A closure device for a cabriolet roof structure, with at least one closure element which can take up an open position and a closed position, wherein the closure device is at least temporarily assigned a sensor device which can detect the open position and the closed position, characterized in that the sensor device comprises just one sensor which generates a first signal when the open position is reached, and which generates a second signal when the closed position is reached.

2. The closure device of claim 1, characterized in that the first signal is deactivated when the open position is departed from, and in that the second signal is deactivated when the closed position is departed from.

3. The closure device of claim 1, characterized in that the first signal and the second signal are identical.

4. The closure device of claim 1, characterized in that the sensor device has a first region which can be detected by the sensor and a second region which can be detected by the sensor, the first region being assigned to the open position and the second region being assigned to the closed position.

5. The closure device of claim 4, characterized in that the first region and the second region are provided on the closure element.

6. The closure device of claim 4, characterized in that the closure element and the sensor are arranged on the same component.

7. The closure device of claim 1, characterized in that the closure element and the sensor are arranged on different components.

8. The closure device of claim 4, characterized in that the sensor is a Hall sensor, and in that the first region and the second region have different magnetic properties from the regions surrounding them.

9. The closure device of claim 8, characterized in that the closure element comprises a hook.

10. The closure device of claim 1, characterized in that the hook forms a latch catch which interacts with a latch.

11. A roof structure for a cabriolet, characterized in that it has at least one closure device as claimed in claim 1.

12. The roof structure of claim 11, characterized in that it has at least one closure device on its left side and on its right side respectively.

13. The roof structure of claim 12, characterized in that at least one closure element is arranged on a folding top compartment cover and at least one sensor is arranged on a locking arm.

14. A method for monitoring a closure device for a cabriolet roof structure, in particular a closure device of claim 1, wherein the closure device has at least one closure element which can take up an open position and a closed position, and wherein the closure device is at least temporarily assigned a sensor device which can detect the open position and the closed position, characterized in that the method comprises the following steps:
generating a first signal by means of a sensor assigned to the sensor device when the open position is reached, and
generating a second signal by means of the sensor when the closed position is reached.

15. The method of claim 14, characterized in that it furthermore comprises the following steps:
deactivating the first signal when the open position is departed from, and
deactivating the second signal when the closed position is departed from.

16. The method of claim 14, characterized in that the first signal and the second signal are identical.

17. The method of claim 16, characterized in that it furthermore comprises the following steps:
carrying out a normalizing operation in order to establish which of the identical signals is the first signal and which is the second signal, and
storing the results of the normalizing operation.

* * * * *